United States Patent

[11] 3,581,902

[72] Inventor James L. Bidler
 Lake Elmo, Minn.
[21] Appl. No. 765,089
[22] Filed Oct. 4, 1968
[45] Patented June 1, 1971
[73] Assignee Minnesota Mining and Manufacturing
 Company
 St. Paul, Minn.

[54] FILTER MADE FROM POWDERED METAL
 6 Claims, 7 Drawing Figs.

[52] U.S. Cl. ............................................. 210/347,
 210/486, 210/496, 210/510
[51] Int. Cl. .............................................. B01d 25/02
[50] Field of Search ........................................ 29/420.5;
 210/486, 488, 455, 457, 350, 347, 496, 510

[56] References Cited
UNITED STATES PATENTS

| | | | |
|---|---|---|---|
| 2,978,108 | 4/1961 | Strassheim | 210/488X |
| 2,997,777 | 8/1961 | Davies | 210/510X |
| 3,294,241 | 12/1966 | Sicard et al. | 210/347X |
| 3,294,242 | 12/1966 | Notari | 210/347 |

Primary Examiner—J. L. Decesare
Attorney—Kinney, Alexander, Sell, Steldt & Delahunt ABSTRACT: A metallurgically integral filter comprising sintered laminae of shaped powdered metal, said laminae comprising an impervious structural member, a filter element, and a pervious support member sandwiched between said structural member and said filter element, with a drainage space between said structural member and said pervious support member. A series of such sintered filters can be stacked within a housing in spaced relation with the drainage areas of said filters communicating with a discharge pipe, to form a filter assembly useful in removing solid particles from liquids or gases.

PATENTED JUN 1 1971

3,581,902

INVENTOR.
JAMES L. BIDLER
BY Kinney, Alexander,
Sell, Steldt & DeLaHunt
ATTORNEYS

FILTER MADE FROM POWDERED METAL

1. Field of the Invention

The invention relates to filters made from sintered powdered metals, and to a process for making such filters.

2. Background of the Prior Art

Filter assemblies comprising a plurality of filter leaves with filter elements made of paper, cloth, or woven wire screens supported by a structural member of some type, with an internal drainage area, are old in the art (see for example U.S. Pat. Nos. 1,726,035, 2,249,063, 2,423,547, and 2,444,147). Due to vibrations, pressures, and other stresses and forces arising during operation, such filter leaves often deform, rupture, or otherwise fail because of their inadequate strength, even when supported, for example, with coarser screens or structural cores. Screens, themselves, are expensive and difficult to manufacture and clean. Improved filter leaves of greater strength and capable of filtering small particles have been disclosed made from sintered powdered metal, using powder metallurgy techniques (see, for example, U.S. Pat. Nos. 2,267,918, 2,293,843, 2,430,078, 2,462,045, 2,463,825, 2,554,343, 2,593,943, 2,909,363, 2,997,777, 3,049,795, 3,152,988, 3,201,858, 3,230,618, 3,241,681, and 3,359,622). However, these prior art powder metal filters have one or more disadvantages, such as requiring the use of expensive specially graded powdered metals, or requiring relatively thick filter elements to obtain needed strength at the sacrifice of flow rate or throughput, or requiring welding, brazing, or mechanical fastening of porous metal parts to wrought parts, or the use of incompressible structural cores against which the filter elements are liable to be compressed under pressure with consequent decrease in flow rate, or requiring densifying pressing operations in fabricating the filter elements.

BRIEF SUMMARY OF THE INVENTION

The filter leaf of this invention is entirely made of sintered powdered metal to form an integral rigid structure which does not have shortcomings of prior art filters made of powdered metal. Briefly, the filter leaf of this invention is metallurgically integral and comprises sintered laminae of shaped powdered metal, the laminae broadly comprising an impervious structural member, a filter element, and a pervious support member interposed or sandwiched between said structural member and said filter element, with a drainage space or area between said structural member and said filter element, said drainage space preferably communicating with a discharge pipe. The term "metallurgically integral" as used herein means that the contiguous surfaces of the filter leaf components are bonded together by interatomic diffusion, as a result of the sintering of the assembly, the sintered filter leaf thus in effect being one piece of metal. In a preferred embodiment, the filter leaf before sintering comprises a laminae of five discs of green, dried, compacted powdered metal with the peripheral edges of the discs sealed with a ring of green undried powdered metal. After being so-assembled, the whole assembly is sintered as a unit to form a metallurgically integral rigid filter leaf. The middle or center disc serves as a structural core and it is substantially impervious and has on its two faces an array of spaced apart protuberances, such as studs integral with the core. Each of the filtering elements is supported by a relatively more permeable support disc of powdered metal which is interposed or sandwiched between the filtering element and the protuberances or studs. The spaces between the core and abutting support members form a drainage space or area which communicates with a central opening passing through the assembly. A series of such sintered filter leaves can be stacked in spaced relation, for example, by interposing separator rings between filter leaves, on a discharge pipe or channeled rod passing through the central openings of the series, and the stack mounted within a housing to form a filter assembly useful in removing solid particles from liquids or gas.

DRAWING

In the accompany drawing, there is illustrated a preferred embodiment of this invention. FIG. 1 is an exploded isometric view of a filter leaf of this invention before it is assembled and sintered. FIG. 2 is a sectional view in elevation of a sintered filter leaf of this invention. FIG. 3 is an enlarged sectional view of the peripheral portion of the filter leaf of FIG. 2. FIGS. 4 and 5 are side elevational views of a discharge rod upon which a plurality of the sintered filter leaves of FIG. 2 can be mounted. FIG. 6 is a sectional view of FIG. 5 taken along the plane 6—6 indicated. FIG. 7 is an elevational view in partial section of a filter assembly in which have been mounted a series or stack of the filter leaves of FIG. 2.

DETAILED DESCRIPTION OF THE INVENTION

Figures 1, 2, 3, 4, 5, 6, 7:
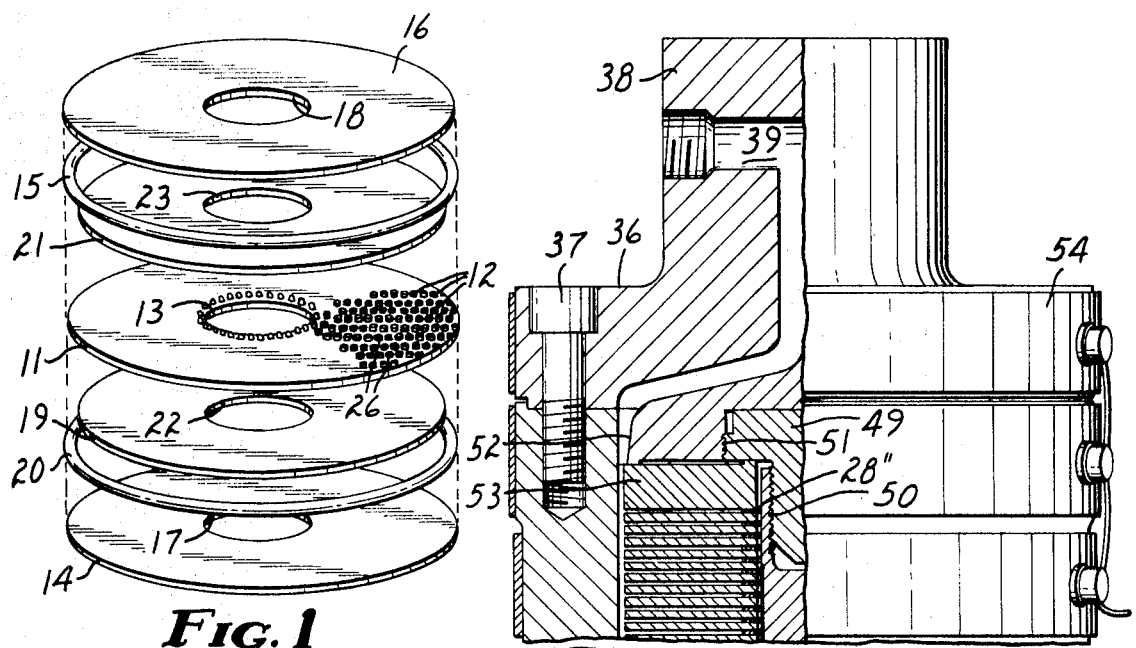

Referring now to the accompanying drawing, and initially to FIG. 1, reference number 11 designates a circular or disclike green structural core of shaped powdered metal, the two faces of which are provided with a plurality of integral protuberances or studs 12 (only a portion of which are shown for brevity), the core having a central opening 13. Members 14 and 16 are circular or disclike green filter elements or media, having a smooth planar face and central openings 17 and 18, respectively. Disposed between core 11 and filter elements 14 and 16 are two circular green disclike supports 19 and 21, which also have planar faces and central openings 22 and 23, respectively. Supports 19 and 21 have outside diameters smaller than core 11 and filter elements 14 and 16 to accommodate seal rings 15 and 20 within which the supports are to be disposed, these rings being made of green, undried powdered metal. By applying a light but sufficient pressure to the top and bottom peripheral portions of the assembly, the seal rings 15 and 20 will be squeezed or extruded around the periphery of the discs to seal the edge of the assembly as shown in detail in FIG. 3.

FIGS. 2 and 3 illustrate the filter leaf of FIG. 1 as assembled and sintered, the contiguous parts of the various discs being metallurgically bonded as a result of the sintering to form an integral rigid unit, generally designated 25, the several central openings of each of these components forming a common central opening 24 with the internal filtrate drainage areas being designated by reference number 26. The peripheral edges of the discs are also metallurgically bonded by a ring 27 resulting from the pressing of rings 15 and 20, as described above. When a plurality of these filter leaves 25 are assembled, they are held in spaced relation by spacer rings 28 disposed on each side of each of the filter leaves. Such spacer rings have a central opening 29 of the same diameter of openings 13, 17, 18, 22 and 23 after the assembly has been sintered.

A series of filter leaves 25 can be mounted on a discharge rod or shaft generally designated 31 illustrated in FIGS. 4, 5 and 6. The outer diameter of rod 31 is such that the stack of filter leaves can be snugly mounted thereon. The outer surface of the discharge rod 31 has a plurality of longitudinally aligned channels 32 which progressively increase in depth toward the bottom of the rod, such channels being in communication with the drainage areas 26 of the series of filter leaves 25 mounted on the rod. The lower ends of channels 32 communicate via passages 30 with a common drain area 35 in the bottom of the rod 31, the lower end of which is threaded at 48 and the upper end being provided with a tapped hole 50.

Referring to FIG. 7, a filter assembly is shown comprising a cylindrical housing or casing 34 surmounted by a top cover or cap 36 which can be fastened thereto by means of bolts 37 or the like. Surmounting cap 36 is a flange 38 provided with inlet port or passage 39. The lower end of casing 34 is mounted on a supporting bottom closure or baseplate 41 and fastened thereto by means of bolts 42 or the like. Baseplate 41 has a lower flange portion 43 with a discharge port or passage 44 therein. As assembled, casing 34 with its top cap 36 and baseplate 41 define an internal chamber 46 which communicates at its upper end with inlet passage 39 to receive liquid or gas laden with solid particles or the like which are to be separated or filtered. Centrally disposed within chamber 46 is a series of stacked filter leaves 25 of FIG. 2, this assembly being generally designated as 47. The lower threaded end 48 of discharge rod 31 is threaded into a tapped hole provided in the upper portion of baseplate 41, so as to support assembly 47 within chamber 46, the lower-most spacer ring 28' of the assembly resting on an internal central shoulder of baseplate 41. The upper threaded hole 50 of discharge rod 31 is threadedly connected to a nipple 49, which in turn is threadedly connected at 51 to a distributor cap 52 which surmounts assembly 47, the distributor cap serving to distribute around such assembly the solid-laden liquid or gas introduced via passage 39. Surmounting the series of stacked filter leaves, and the uppermost spacer ring 28'', is a retaining ring or collar 53.

Means such as pipes or the like for supplying the solid-laden material to be filtered and for withdrawing the filtered material are conventional and are not shown in the drawing in the interest of brevity. Further, the filter assembly can be supported by any conventional means in an upright position, for example, by legs or a platform. Where it is desirable to maintain the material being filtered in a heated state, the outer wall of the assembly can be provided with conventional electrical heating bands 54 or the like.

As mentioned hereinbefore, the entire filter leaf of this invention is made from sintered powdered metals using, in part, conventional powder metallurgy techniques. An excellent description of this metallurgical process is found in "Review of the Powder Metallurgy Process," July, 1966, published by the U.S. Army Production Equipment Agency, Manufacturing Technology Division, Rock Island Arsenal, Illinois. Also see U.S. Pat. No. 3,367,752.

The preferred powdered metals used in this invention are those of austenetic chromium-nickel stainless steel, these alloys generally containing 16.0 to 26.0 weight percent chromium, 6.0 to 22.0 weight percent nickel, 0.03 to 0.25 weight percent carbon, and occasionally some other elements added to develop certain specific properties, such as 1.75 to 4.00 weight percent molybdenum or small amounts of titanium, tantalum, and niobium to minimize formation of chromium carbides, especially in welding. Standard types of these steels have been assigned numbers and specifications by the American Iron and Steel Institute. These are generally known in the art as stainless steels of the AISI 300 series, types 301, 302, 304 and 305 generally referred to as "18—8" stainless steel, and the "workhorse" type 316 generally referred to as "18—8 Mo." All of these AISI stainless steels of the 300 series are applicable in the practice of this invention. Of course, other powdered metals can be used in fabricating the filter leaves of this invention, such as nickel, tungsten, copper, and the like, and alloys of such metals, including bronze, monel, etc.

In making the structural core of the filter leaf, the particle size of the powdered metal should be fine enough so that the resulting shaped structural core, upon sintering, will be relatively strong and impermeable. For this purpose, a particle size of −325 mesh is preferred. The filter elements are made from powdered metal which is relatively coarse in order, upon sintering the resulting shaped disc, to obtain the desired permeability or micronic rating. The support disc or backup for the filter element is made from powdered metal which is relatively coarser than that used to make the filtering elements. For purposes of making the filter elements and supports, mesh sizes in the range of −50+325 can be used, such as 200+325, −100+200, −50+100, or blends thereof, suitably selected to produce the desired micronic rating or bubble point, and to that end small amounts of, e.g., 1—20 weight percent of −325 mesh can be blended with the coarse powder, i.e., with the −50+325 mesh. (The term "mesh" referred to herein means mesh size according to U.S. Standard Sieve.) The use of powdered metal with these mesh ranges will enable one to make filter leaves in accordance with this invention with various micronic ratings, e.g., in the range of 1 to 150 microns.

In fabricating each of the filter leaf components, the powdered metal of desired mesh is blended with an organic heat-fugitive binder, such as those disclosed in U.S. Pat. Nos. 2,593,943, 2,709,651, and 2,902,363; the preferred binder is methyl cellulose. Various solvents can be used in conjunction with these binders, such as water, as well as various plasticizers, such as glycerin. The blending can be carried out in a conventional manner in various types of commercially available mixers, blenders, tumblers, and the like, care being taken to insure that the blend is homogeneous and the components well dispersed. The resulting blend will be in the nature of a plastic mass or dough and will be similar in consistency to that of modeling clay. The plastic mass can be shaped on a rubber mill, calendared, or knife-coated to the desired thickness and then dried to form a green sheet having a leathery nature. In the case of the structural member or core, the green sheet can be suitably embossed or otherwise shaped to form the protuberances or studs necessary to provide the drainage area for the filter leaf. The green sheets can then be cut to size, taking into account the 1—25 percent linear shrinkage which will occur upon sintering and compensating for it by cutting the shapes with oversize dimensions.

The green components forming the laminae of the filter leaf are assembled in the proper contiguous relation using suitable fixtures and dies. The binder is reactivated by addition of solvent or 1—3 percent solution of binder in solvent and the entire assembly is pressed lightly to cohere the laminae and extrude the sealing rings into place and thereby produce a coherent integral green structure. This integral green structure is then sintered under vacuum or a suitable atmosphere, such as a reducing atmosphere like hydrogen or dissociated ammonia. Sintering atmosphere, temperature, and duration of sintering will depend upon the particular powdered metals used, the selection of these conditions being within the skill of the art. In the case of the austenetic stainless steels mentioned above, a hydrogen or dissociated ammonia atmosphere with a dew point of −40° F. or lower and sintering temperatures in the range of 1,200° to 1,400° C., preferably 1,250° to 1,350° C., will be suitable, and the duration of sintering will usually be from 10 minutes to 2 or 3 hours.

As is evident from the above, the filter leaf of this invention is made entirely from powdered metals without requiring or employing wrought metal components. The filter leaf is constructed without welding and is, therefrom, free of the disadvantages associated with welding or other means of fastening. Fabrication of the filter leaf does not require the use of specially graded metal powders and does not depend upon the thickness of the filter element for its density or strength; consequently, the filter element can be designed to optimize the porosity and flow characteristics. An important advantage or feature of the filter leaf of this invention is the integral metallurgical or sinter bond between the various laminae, each of which serves several functions without hampering the integrity of the entire filter leaf, this feature enabling the filter leaf to withstand stresses and other forces normally encountered during operation without being prone to the deformation, rupture, or other types of failure experienced with prior art filters of powder metal which do not have the metallurgically integral supported features of this invention. This construction also will withstand reverse flow conditions and back-flushing cleaning operation without the likelihood of failure. Higher operating pressures can be used without fear that the filter element will be deformed against the supporting core and result in loss of effective filtering area and drainage by virtue of pressure sealing of the filter element against the structural core, which is commonly found where the support used for the filter element is a woven wire screen. The drainage area of the filter leaf has the advantage of simplicity of construction over prior art devices which depend upon the use of a screen or a volatilized or leached pathway. Since the uniformity and density of the green sheets used to make the various laminae of the filter leaf of this invention can be closely controlled to a high degree of dimensional tolerance, and because it is not necessary to extrude, roll, or otherwise work the assembled laminae, high dimensional control is achieved in the final sintered article.

In another aspect of this invention, the support member (e.g., items 19 and 21 in FIG 1) sandwiched between the filter element and structural member, is fabricated from a green sheet comprising a blend of powdered ferrite stabilizer (e.g., molybdenum) and powdered austenitic chromium-nickel stainless steel, as described in copending application Ser. No. 743,588, filed July 10, 1968, by T. R. Bergstrom. When this support member is sintered as part of the assembled filter leaf, it forms at 1,250–1,350°C C. an essentially two-phase structure of austenite and ferrite, having high tensile strength, thereby enhancing the overall strength of the filter leaf. Also, making the support member from this blend of austenitic stainless steel and ferrite stabilizer will enable one to make a thinner support element at equivalent strength than if only stainless steel powder is used, and the thinner the support member (without sacrifice in strength) the more filter leaves one can put in a filter housing and the greater the capacity or throughput of the filter. Further details concerning the fabrication of this support member will be omitted in the interest of brevity and reference to said copending application Ser. No. 743,588 is made for that purpose, the disclosure of which is incorporated herein. The filter element and/or the structural member or core can also be made of the blend of austenitic stainless steel and ferrite stabilizer if additional strength is desired.

EXAMPLES

The object and advantages of this invention are further illustrated by the following examples, but the particular materials and amount thereof recited in this example, as well as other conditions and details, should not be construed to unduly limit this invention.

A center structural core was made by mixing 3,200 grams of −325 mesh stainless steel powder (Anchor 316 L), 150 grams of 4,000 cps. methyl cellulose (Methocel), and 410 ml. of a 15 volume percent solution of glycerin in water, in a Braebender sigma blade mixer for 1 hour, after which the material had the consistency of modeling clay. The claylike material was then formed into a sheet 0.125-inch thick by passing it through a rubber mill. After drying for 24 hrs. at room temperature, the green sheet was placed between two 1/16-inch thick perforated metal plates, having 9/64-inch round, staggered holes at 3/16-inch centers, and pressed until the material filled the holes in the perforated sheet to form an array of studs one-sixteenth inch in height. The perforated plates were removed and a 7.50-inch disc with a 2.00-inch center hole was cut from the studded green sheet using a suitable die.

The intermediate, large pore size, support discs were made from a mixture of 2,850 grams of −50+100 mesh 316L stainless steel powder (Anchor 316L), 150 grams of molybdenum powder (Fisher No. of about 4 microns), 150 grams of 4,000 c.p.s. methyl cellulose, and 650 ml. of a 15 volume percent solution of glycerine in water, in a sigma blade mixer for one hour, at which time the material had the consistency of modeling clay. A sheet 0.050-inch thick was made by passing the material through a rubber mill, after which the sheet was dried at room temperature, and 7.25-inch diameter discs with a 2.00-inch center hole were cut from the sheet using a suitable die.

The filter elements were made by mixing 2,400 grams of −100+200 mesh and 600 grams of −325 mesh 316L stainless steel powder (Anchor 316L), 150 grams of 4,000 c.p.s. methyl cellulose, and 525 ml. of a 15 volume percent solution of glycerine in water, in a sigma blade mixer. The resulting claylike material was sheeted, dried, and cut into 7.50-inch diameter, 0.035-inch thick discs with a 2.00-inch center hole in the same manner as the support disc described above.

Both faces of the center structural disc and the intermediate support discs, and the inner face of the filter element discs were wetted with a 1 weight percent solution of 4,000 c.p.s. methyl cellulose in water and stacked in the proper order (see FIG. 2) over a 2.00-inch post. An extruded rod, made by forcing the undried, claylike −325 mesh stainless steel through a 0.300-inch die, was shaped in the form of a ring around a 1/8-inch peripheral portion of both sides of the center structural core before the intermediate support and outer filter element discs were positioned. The resulting assembly was compressed around the outer peripheral portion, using a pressing and retaining ring, to force the −325 mesh extruded rings over the edge of the inner structural disc. All discs were thereby cohered together using the cohesiveness of the methyl cellulose. After room temperature drying, the peripheral portion of the assembly consisted of a −325 mesh bead sealing the edge of the assembly.

The green assembly was placed on an inert sagger and heated slowly to 1,350° C. in a hydrogen atmosphere and held for 2 hrs. The resulting sintered filter leaf was an integral composite with all discs metallurgically bonded together. The filter elements were 0.035-inch thick, 50 percent porous, and had an absolute micronic rating of 20 microns. The intermediate support members were 0.050-inch thick, 50 percent porous, and had an absolute filtration rating of 65 microns. The center structural core was 0.180-inch thick across the embossed projections and had 0.062 inch of continuous material between the embossed projections. The filter leaf was 7.00 inches in diameter with a 1.90-inch hole through the center.

The pressure drop across two of the filter leaves prepared as described above was determined by filtering molten viscous polyester and for purposes of comparison the pressure drop of two commercial prior art filter leaves made of powdered metal was also determined. Each of the prior art filter leaves comprised an inner stainless steel screen sandwiched between two filter elements (supported only by the screen) each measuring 0.062 inches in thickness and 7 inches in diameter and made from sintered porous sheets of powdered stainless steel. The filter leaf assembly had a weld about its periphery and a machined center hub of wrought steel. These prior art filter leaves had substantially the same filter area and micronic rating as the filter leaves of this invention made as described above. Table 1 sets forth the resets of this comparison

TABLE I

| Filter leaves of subject application | | | | Prior art filter leaves | | | |
|---|---|---|---|---|---|---|---|
| Number 1 | | Number 2 | | Number 3 | | Number 4 | |
| Pressure drop, p.s.i. | Flow rate lb./hr. | Pressure drop, p.s.i. | Flow rate lb./hr. | Pressure drop, p.s.i. | Flow rate lb./hr. | Pressure drop, p.s.i. | Flow rate lb./hr. |
| 318 | 13.7 | 330 | 20.6 | 560 | 17.3 | 900 | 16.1 |
| 407 | 22.1 | 475 | 31.7 | 817 | 25.8 | 1,200 | 21.6 |
| 583 | 29.4 | 690 | 39.5 | 1,208 | 32.4 | 1,625 | 29.1 |
| 768 | 35.6 | 865 | 47.9 | 1,503 | 39.2 | 2,050 | 33.2 |
| 743 | 38.1 | 905 | 48.8 | 2,063 | 46.5 | 2,415 | 38.9 |
| 1,010 | 48.0 | 950 | 55.0 | 2,510 | 50.3 | 2,740 | 42.3 |
|  |  | 1,165 | 70.3 | 2,405 | 53.5 | 3,145 | 49.5 |
|  |  | 1,340 | 65.3 | 2,882 | 61.0 | 3,725 | 57.3 |
|  |  |  |  |  |  | 4,050 | 57.6 |

As the data of Table I show, the pressure drop across the filter leaf of this invention is as much as about 2.5 to 3 times less than that across the prior art filter leaf at equal flow rate.

The air permeability of the filter leaf of this invention was 2.8 times greater than that of the prior art filter leaf and the flexural stiffness of the former was 2 to 3 times greater than that of the latter.

Filter leaves made by the teachings of this invention were used to filter a viscous, molten polyester polymer at 550° F. until a maximum pressure differential of 4,500 p.s.i. was reached, with excellent results.

Various modifications and alterations of this invention will become apparent to those skilled in the art without departing from the scope and spirit of this invention, and it should be understood that this invention is not to be unduly limited to the illustrative embodiment set forth herein.

I claim:
1. A metallurgically integral filter leaf of sintered laminae of shaped powdered metal comprising a substantially impervious structural member, a filter element, and a pervious support member sandwiched between said structural member and said filter member, with a drainage space between said structural and support members.

2. A metallurgically integral filter leaf of five jointly sintered laminae of powdered metal comprising, in combination: a substantially impervious core having a plurality of spaced-apart protuberances protruding form each side of said core; pervious support members disposed on each side of said core and contiguous with the protuberances protruding from said side, thereby forming a drainage space on each side of said core; and filter elements of less permeability than said support members and disposed on each of the outer sides of said support members and contiguous therewith; said core, support members, and filter elements being shaped in the form of discs with their peripheries metallurgically sealed together and having a common central opening which communicates with said drainage spaces.

3. A filter leaf according to claim 2, wherein said powdered metal comprises austenitic chromium-nickel stainless steel.

4. A filter leaf according to claim 3, wherein said pervious support members comprise austenitic chromium-nickel stainless steel and ferrite stabilizer.

5. A filter assembly comprising, in combination: a housing having an inlet and an outlet, with a filtering chamber disposed within said housing and in communication with said inlet; a plurality of the filter leaves of claim 1 disposed within said chamber in spaced-apart relation and with the drainage areas of said filter leaves communicating with a common drainage conduit that communicates with said outlet.

6. A filter assembly comprising, in combination: a housing having an inlet at its upper end and an outlet at its lower end with a filter chamber disposed within said housing and in communication with said inlet; a plurality of the filter leaves of claim 2 disposed within said chamber, said filter leaves being mounted in spaced apart relation on a drainage shaft passing through the common central openings of said filter leaves, said shaft having drainage channels therein which communicate with said drainage spaces of said filter leaves and which communicates with said outlet.

UNITED STATES PATENT OFFICE
CERTIFICATE OF CORRECTION

Patent No. 3,581,902    Dated June 1, 1971

Inventor(s) James L. Bidler

It is certified that error appears in the above-identified patent and that said Letters Patent are hereby corrected as shown below:

Column 1, line 22, "2,909,363" should read -- 2,902,363 --.
Column 2, line 19, "disclike" should read -- disc-like --.
Column 5, line 9, "1,350°C.C." should read -- 1,350° C. --.
Column 6, line 38, "resets" should read -- results --; line 53, 5th column of Table I, "2405" should read -- 2495 --. Column 7, line 7, "form" should read -- from --.

Signed and sealed this 21st day of December 1971.

(SEAL)
Attest:

EDWARD M. FLETCHER, JR.          ROBERT GOTTSCHALK
Attesting Officer                Acting Commissioner of Patents